United States Patent [19]

Fay

[11] Patent Number: 4,595,630
[45] Date of Patent: Jun. 17, 1986

[54] PROCESS FOR PRODUCING GLASS FIBER PRODUCTS AND RESULTING PRODUCT

[75] Inventor: Ralph M. Fay, Lakewood, Colo.

[73] Assignee: Manville Corporation, Denver, Colo.

[21] Appl. No.: 748,256

[22] Filed: Jun. 24, 1985

[51] Int. Cl.$^4$ .................. C03C 25/02; D04H 1/58; B32D 27/42

[52] U.S. Cl. .................. 428/288; 65/3.43; 156/335; 428/391; 428/429; 428/436; 428/451

[58] Field of Search .................. 65/3.43; 428/378, 391, 428/429, 436, 451, 288; 156/335

[56] References Cited

U.S. PATENT DOCUMENTS

| | | | |
|---|---|---|---|
| 3,215,585 | 11/1965 | Kneipple | 65/3.43 |
| 3,616,179 | 10/1971 | McCombs | 156/335 X |
| 3,616,181 | 10/1971 | Stalego | 65/3.43 X |
| 3,742,101 | 6/1973 | Ouchi et al. | 65/3.43 X |
| 3,839,236 | 10/1974 | Foley et al. | |
| 3,846,225 | 11/1974 | Stalego | |
| 3,932,686 | 1/1976 | Foley et al. | 428/268 |
| 4,014,726 | 3/1977 | Fargo | 156/167 |
| 4,210,562 | 7/1980 | McCombs | 428/429 X |
| 4,516,996 | 5/1985 | Willard et al. | 65/3.43 |

*Primary Examiner*—Robert Lindsay
*Attorney, Agent, or Firm*—John D. Lister; Cornelius P. Quinn; Gregory A. Evearitt

[57] ABSTRACT

An improved process for the preparation of a glass fiber product useful as range insulation for pyrolytic self-cleaning oven units is disclosed. An integral part of the inventive process involves a two stage curing of the insulation product. When range insulation produced by the inventive process is used in pyrolytic self-cleaning oven units, the insulation emits reduced levels of smoke and odor during the self-cleaning cycle.

6 Claims, No Drawings

PROCESS FOR PRODUCING GLASS FIBER PRODUCTS AND RESULTING PRODUCT

This invention relates to a novel improved process for the production of glass fiber products.

Phenolic resins and their use as binders in various glass fiber products are well known. In the production process for such bonded glass fiber products, the glass fibers are sprayed with the phenolic resin binder and are then passed through an oven. In the oven, the bonded glass fibers are compressed to a selected thickness and density and then cured.

One of the typical uses for such bonded glass fiber products is as insulation in self-cleaning ovens and ranges. When conventional bonded glass fiber products are used for such and consequently exposed to pyrolysis temperatures on the order of 850°–950° F. used in the oven self-cleaning cycle, they tend to emit obnoxious odors and large amounts of smoke due to the thermal decomposition of the binder. The smoke and odor damage are not only personally unappealing but are dangerous as well from both a health and safety viewpoint. Emission of this undesirable smoke and odor from the oven occurs during the first self-clean cycle. A typical over self-clean cycle has a duration of one to three hours. The above problems associated with such conventionally phenolic resin bonded glass fiber products obviously limit their commercial uses.

Applicant sought out a way to prevent the smoke and odor problems associated with conventionally bonded fiber glass products. During the course of research, Applicant discovered that by applying an additional curing step to the bonded glass fiber products, the resulting products could be used in higher temperature applications, such as insulation in self-cleaning ovens and ranges, with a significant reduction in the smoke and odor problems previously encountered. Through the lowering of these two problems products containing the bonded glass fibers made by the improved inventive process should find greater commercial acceptance because of their attenuated health and safety problems.

It is therefore an object of this invention to provide an improved novel process for the production of bonded glass fiber products.

Other aspects, objects, and the several advantages of the present invention are apparent from the specification and appended claims.

In accordance with the present invention, Applicant has discovered a novel process for the production of bonded glass fiber products. Applicant's novel process comprises, in order, the following steps:

(a) combining glass fibers with a heat curable binder composition, said binder composition comprising:
 (i) 84–99 wt % of at least one phenolic resin;
 (ii) 0.05–0.30 wt % of a silane coupling agent;
 (iii) 1.0–6.0 wt % of a suitable catalyst; and
 (iv) 0–15 wt % of a suitable dedusting agent;
(b) consolidating the fibers and heat curable binder into a loosely packed mass;
(c) compressing the consolidated fibers to a density of no greater than about 4.0 pcf;
(d) curing the consolidated fibers at a temperature of about 350°–500° F. for about 1–10 minutes; and
(e) thereafter curing the fibers at a temperature of about 700°–1000° F. for about 10–120 seconds in an air rich atmosphere.

Preferably the binder composition used in the process of the present invention will comprise about 85–89 wt % of at least one phenolic resin; about 0.08–0.12 wt % silane; about 3.5–4.5 wt % of a suitable catalyst; and about 8–11 wt% of a suitable dedusting agent.

In the present invention, the glass fibers can be those produced in any conventional manner or alternatively, any of those which are commercially available can be used. When made, the glass fibers typically are produced by flowing streams of fused materials through small orifices and then drawing out the streams at speeds capable of attenuating the materials into fibers of desired diameters.

The phenolic resin is one selected from the group consisting of phenol-formaldehyde partial condensation products and phenol-amino compound-formaldehyde condensation products, and is a phenolic resole. Such phenolic resoles are known to the art. In general, a phenolic resole is produced in the presence of a basic catalyst by reaction in an aqueous system of more than one mole of formaldehyde per mole of phenol. Phenol-amino compound formaldehyde condensation products can be produced by an aqueous alkaline condensation of phenol and formaldehyde to produce a mixture consisting essentially of phenol alcohols, adjustment of this phenol alcohol mixture to a pH at which further condensation of the phenol and formaldehyde is minimized and adding melamine or another aminoresin-former. The resulting reaction mixture can be heated to condense the melamine or other amino compound with the phenol alcohols and any unreacted formaldehyde. Condensation, particularly when the amino compound is urea or dicyandiamide, occurs under ambient conditions so that the heating step can be omitted when these amino compounds are used or, in any event, heating can be employed to cause an appreciable condensation of the melamine or other amino compound.

The identity of the particular reactants employed to produce the heat-hardenable phenolic resins appears to be of only incidental importance.

In most instances, and preferably so, formaldehyde and phenol are used, although any aldehyde and phenol producing a hardenable phenolic resole-type partial condensation product can be used. Aldehydes which can be used for replacement of the formaldehyde, in whole or part, include: paraformaldehyde, furfural, acetaldehyde, metaldehyde, tetraldehyde and the like. Phenols which can be used for replacement of the hydroxy benzene in whole or in part include: various cresols, xylenols, resorcinol, and the like. While melamine is frequently used as the amino-resin-former reactant, urea, thiourea, dicyandiamide and other like amino compounds capable of condensation with phenol alcohols and formaldehyde also can be used in place of part or all of the melamine.

In the present invention, it is thought that any commercially available silane coupling agent may be used. However, the preferred silanes are aminoalkylsilanes. Certain epoxy silanes may also be utilized.

The aminoalkylsilanes which are suitable for incorporation in the binder composition used in the process of the present invention have the general formula: $R_n$—Si—$(-OR')_{(4-n)}$ where R is an aminoalkyl radical chemically bonded to the silicon atom, R' is an alkyl radical having from 1 to 4 carbon atoms, and n is an integer from 1 to 3, inclusive. A preferred class of silanes represented by the foregoing formula is one wherein n is 1 and R has the formula $H_2N$—$R''$, and wherein $R''$ is an alkylene radical having from 2 to 6 carbon atoms. A typical such silane is gamma-aminopropyltrimethoxysilane. Another such preferred class is one where R has the formula H$_2$N—R''—NH—R'', wherein each R'' independently represents an alkylene radical having from 2 to 6 carbon atoms.

Typical epoxy silanes suitable for use as bonding aids in binders according to the present invention include beta-(3, 4 epoxycyclohexyl)-ethyltrimethoxysilane and gamma-glycidoxypropyltrimethoxysilane.

A catalyst is also used in the binder according to the present invention. Such a catalyst is one which is effective during curing conditions to change the pH of the system to one at which condensation occurs at a relatively rapid rate. Typically, in a phenolic-resole system there is utilized an ammonium sulfate catalyst which under resin curing conditions releases ammonia gas from the system thereby decreasing the overall pH thereof.

A suitable debusting agent may optionally be employed in the binder formulation. For the purpose of the present invention, a suitable debusting agent is one which functions to prevent fiber ends or so-called "fiber dust" from flying off into the air during the production process. Such fiber ends or dust can pose a health hazard. Typically the dedusting agent will be a neat or emulsified viscous hydrocarbon type oil. In instances where dust suppression is of extreme importance a dedusting agent must be selected which continues to perform after the additional curing step. High temperature resistant dimethyl silicone fluids, such as General Electric SM2068, have been found to be useful.

Optional ingredients for the binder composition include a silicone release agent and an anti-foam compound. The preferred release agent is commercially available under the designation Si-55, and can be obtained from the General Electric Company. However, other conventional release agents can be used. The release agent functions to prevent build-up of the resin on the oven conveyor and associated apparatus carrying the glass fiber mat. When used, the release agent is desirably present in an amount ranging from about 0.2 to about 4 percent. A suitable anti-foaming agent may be added if desired. For instance, one of the surface-active materials (a blend of processed saturated fats of predominantly sulfated high melting point derivatives or a blend of non-ionic and anionic materials produced form saturated fatty derivatives) successfully used in the preparation of latex paints to minimize air entrapment by coalescence of bubbles can be utilized. This ingredient is not critical and can be omitted when foaming is not considered a critical problem.

The anti-foam agent is added as needed during the preparation of the binder. The preferred anti-foam agent is commercially available under the trade designation Anti-Foam Q, and is preferably added as a mixture of 10 parts Anti-Foam Q in 90 parts toluene. Any of the conventional anti-foam agents can be used instead of Anti-Foam Q.

Other adjuvants such as various filters, pigments, dyes, etc. can be used if desired, but such are not essential for the binder to be effective.

The binder composition may be made according to any method known to those skilled in the art. Typically the phenolic resin, silane coupling agent and catalyst, are charged to a binder mix tank with continuous agitation with the pH adjusted to about 8.5 with the addition of ammonium hydroxide. An emulsified dedusting agent is then added to the mixture with further agitation. Optional application of an emulsified or neat debusting agent can be done separate from the binder application.

Desirably, the binder composition is applied to the glass fibers in such a way that the binder comprises from about 1.0 to about 20 wt % of the total weight of the glass fiber products. The binder preferably constitutes about 1.2 to about 2.1 of the total weight of the glass fiber product on a dry weight basis.

The binder and fibers are combined in any suitable manner. Typically, the binder is associated with the glass fibers in a forming hood and then they are projected onto a chain conveyor. The mass of fibers are then compressed to a density of no greater than about 4 pcf and preferably in the range of about 0.5–4.0 pcf and sent to a series of ovens for heating and curing.

Curing of the bonded glass fiber mass takes place in two stages. In the first stage, the consolidated fibers are heated at a temperature of about 350°–500° F. for about 1–10 minutes, preferably at 430°–470° F. for about 2–5 minutes.

Thereafter, the consolidated fibers are second stage cured at a higher temperature on the order of about 700°–1000° F. for about 10–20 seconds, preferably about 850°–950° F. for about 30–50 seconds, in an air rich atmosphere. As used herein the term air rich atmosphere is meant to designate a situation where air is passed through the consolidated fibers and not just contacting the surface thereof.

Even though the concentration of the binder on fiber glass product produced by this two stage curing process is reduced by 0–40%, the binder backbone which remains continues to provide structural integrity, resiliency and minimal dust similar to single stage cured products. Fiber glass range insulation produced by this two stage curing process and used to insulate self-clean ovens yields a significant decrease in thermal decomposition products which are emitted from the fiber glass binder during the initial self-clean cycle.

The following examples further illustrates the present invention.

EXAMPLE I

Two different range insulation products were prepared by combining glass fibers with a calcium catalyzed phenolic binder (Reichold 96-864) and a barium catalyzed phenolic binder (Georgia Pacific 2811) respectively. The two binders had the following formulations: 87 wt % of a calcium or barium catalyzed phenolic resin; 0.1 wt % of A1100 silane coupling agent; 4.0 wt % ammonium sulfate; and 8.9 wt % hydrocarbon dedusting oil. The resulting mass of glass fibers and binder was then consolidated into a loosely packed mass and the consolidated fibers then compressed to a density in the range of about 1.3 pcf. One sample each of both the calcium and barium catalyzed phenolic resin containing fiber glass products were then curred at about 450° F. for 4 minutes. Additionally one sample of each product was cured at about 450° F. for 4 minutes and then at about 900° F. for 40 seconds in an air rich atmosphere as disclosed in the present invention.

Quantitive analysis was then performed on the thermal degradation species (emitted from the range insulation samples during a simulated oven self-cleaning cycle) using mass spectrometer analysis spiked with an internal standard. Results are given below in Table I.

TABLE I

| Compound | Amount of Compound (ppm) emitted per gram of Calcium Catalyzed Phenolic Range Binder[1] Product | | Amount of Compound (ppm) emitted per gram of Barium Catalyzed Phenolic Range Binder[2] Product | |
| --- | --- | --- | --- | --- |
| | one stage[3] cure | two stage[4] cure | one stage[3] cure | two stage[4] cure |
| pyridine | 2.5 | 2.5 | — | — |
| diazohexane | 3.9 | — | 4.9 | 1.0 |
| methylbenzene | 4.2 | 3.2 | 6.5 | 3.5 |
| hydrocarbon[5] | — | 0.7 | 1.5 | 1.1 |
| hydrocarbon[5] | — | 0.4 | — | — |
| octane | — | — | — | 1.1 |
| 1,3 dimethyl benzene | 2.4 | — | 3.4 | 1.7 |
| 1,4 dimethyl benzene | — | 1.5 | — | — |
| hydrocarbon | — | — | 2.8 | 0.9 |
| phenol + isocyanobenzene | 15.8 | 6.2 | 35.0 | 22.4 |
| benzofuran | — | 1.2 | 5.9 | 3.2 |
| 2-methyl phenol | 19.6 | 6.0 | 62.0 | 23.2 |
| 4-methyl phenol | 6.1 | 1.7 | 30.0 | 14.5 |
| 2,5 dimethyl phenol | 11.0 | 2.9 | 34.0 | 13.5 |
| 3,5 dimethyl phenol | 15.2 | 3.2 | 49.0 | 22.0 |
| 2,4 dimethyl benzene amine | 7.8 | 7.9 | — | — |
| ethyl benzene methanol | — | — | 3.9 | — |
| 2,4,6 trimethyl phenol | 10.7 | — | 37.0 | 15.0 |
| diethyl phenol | 2.5 | — | 44.0 | 5.0 |
| 4 formyl benzoic acid | — | — | 3.5 | 1.2 |
| Total ppm/g of Product | 101.7 | 37.4 | 323.4 | 129.3 |
| % Reduction due to two stage cure | — | 63% | — | 60% |

NOTES:
[1] Applied at a binder content of 1.25 wt % of coated fiber
[2] Applied at a binder content of 1.60 wt % of coated fiber
[3] Cured at about 450° F. for 4 minutes
[4] Cured at about 450° F. for 4 minutes and then at about 900° F. for 40 seconds.
[5] Unable to positively identify the exact chemical species The above data clearly show that the inventive process involving two stage binder curing where the second stage was conducted at about 900° F. for 40 seconds in an air rich atmosphere exhibits at least a 60% concentration reduction in the measurable organic thermal decomposition products as compared to just a one stage cure. This reduction in organic decomposition products is directly proportional to a reduction in smoke and odor emitted from range insulation during an oven self-cleaning cycle.

EXAMPLE II

Both a one-stage cured and two-stage cured insulation product (made from a barium catalyzed phenolic binder according to Example I above) were tested for tensile strength according to the following procedure with the results given below in Table II.

Insulation sample specimens were cut into dimensions of 4" width by 10" length by 2.5" thick. The samples were then tested in an Instron Universal Tester for tensile strength using a 2" jaw separation at the rate of 12"/min. The average and standard deviation tensile strengths were recorded in lbs.

TABLE II

| | One Stage Cured Range Insulation 4 minutes at 450° F. | Two Stage Cured Range Insulation 4 minutes at 450° F. +45 seconds at 900° F. |
| --- | --- | --- |
| Machine Direction Average tensile strength | 11.1 | 10.8 |
| Standard deviation | 2.1 | 2.1 |
| Cross machine direction Average tensile strength | 12.7 | 12.6 |
| Standard deviation | 2.2 | 2.3 |

The above data indicate that the tensile strength of insulation is not adversely affected by the addition of a second stage curing step.

EXAMPLE III

Range insulation samples were made according to the procedure detailed in Example I using a binder having the following formulation: 87 wt % calcium catalyzed phenolic resin; 0.1 wt % A1100 silane; 4.0 wt % ammonium sulfate; and 8.9 wt % of ahydrocarbon debusting agent. Four range insulation samples were then subjected to the curing conditions listed below in Table III, with the % Loss on Ignition (LOI) and product resiliency of each sample being measured.

The LOI of each specimen was measured by taking 5-20 g samples of the insulation and weighing them to within 0.01 g. The insulation samples were then placed in a muffle furnace at 950° F. for two hours. The samples were then removed and allowed to cool to room temperature. Each sample was then reweighed to within 0.01 gram. Percent LOI was then calculated according to the following formula:

$$\% \text{ LOI} = \frac{\text{(original weight} - \text{final weight)}}{\text{(original weight)}} \times 100$$

The product resiliency test was conducted by measuring the thickness of 6"×6" specimen samples of the treated insulation at a load of 68 g on a Gustin Bacon thickness tester. The specimens were then placed in a 7"×7" aluminum plate compression jig with the thicknes of each sample set to 25% of its original thickness as measured above. The jigs were placed in a humidity cabinet at 155° F. and 95% RH for about two hours. The jigs were then removed from the humidity cabinets and let stand for 30 minutes at room temperature. The compression on each specimen was released with the specimens being removed from the jig and allowed to remain at room temperature for one hour. The thickness of each specimen was then measured as above with the product resiliency being measured as % recovery according to the following formula:

$$\% \text{ Recovery} = \frac{\text{(recovered thickness)}}{\text{(original thickness)}} \times 100$$

TABLE III

| Range Insulation Cure | Phenolic Binder Content of Product (% LOI) | Product Resiliency, % Recoveries after compressed aging: 2 hrs at 155° F. (95% RH) |
| --- | --- | --- |
| Control (Single-stage) 4 min at 450° F. | 1.62 | 90.0 |
| +40 Seconds at 600° F. | 1.27 | 85.0 |
| +40 Seconds at 750° F. | 1.20 | 91.8 |
| +40 Seconds at 900° F. | 1.03 | 84.2 |

The above data demonstrate that although a portion of the phenolic binder is lost during the additional two-stage curing step, range insulation produced by the inventive process still maintains a high degree of resiliency.

Reasonable modifications and variations are possible from the foregoing with departing from the spirit or scope of the present invention.

I claim:

1. An improved process for the preparation of a glass fiber product useful as range insulation for pyrolytic self-clean oven units comprising, in order, the steps of:
   (a) combining glass fibers with a heat curable binder composition, said binder composition comprising
      (i) 84-99 wt % of a phenolic resin
      (ii) 0.05-0.30 wt % of a silane
      (iii) 1.0-6.0 wt % of a suitable catalyst
      (iv) 0-15 wt % of a suitable dedusting agent;
   (b) consolidating the fibers and heat curable binder into a loosely packed mass;
   (c) compressing the consolidated fibers to a density no greater than about 4.0 pcf;
   (d) curing said consolidated fibers at a temperature of about 350°-500° F. for about 1-10 minutes; and
   (e) thereafter curing the fibers at a temperature of about 700°-1000° F. for about 10-120 seconds in an air rich atmosphere.

2. A process according to claim 1 wherein said binder composition in 1(a) comprises:
   (i) 85-89 wt % of a phenolic resin;
   (ii) 0.08-0.12 wt % of a silane;
   (iii) 3.5-4.5 wt % of a suitable catalyst; and
   (iv) 8-11 wt % of a suitable dedusting agent.

3. A process according to claim 1 wherein the combined glass fibers resulting from 1(a) are projected onto a conveyor before the consolidation in 1(b).

4. A process according to claim 1 wherein the curing in 1(d) is conducated at a temperature of about 430°-470° F. for about 2-5 minutes.

5. A process according to claim 1 wherein the curing in 1(e) is conducted at a temperture of about 850°-950° F. for about 30-50 seconds.

6. The product formed by the process of claim 1.

* * * * *